United States Patent
Vijn et al.

(10) Patent No.: US 6,405,801 B1
(45) Date of Patent: Jun. 18, 2002

(54) ENVIRONMENTALLY ACCEPTABLE WELL CEMENT FLUID LOSS CONTROL ADDITIVES, COMPOSITIONS AND METHODS

(75) Inventors: Jan Pieter Vijn, Leiden; Bach Dao, Lisse, both of (NL); Mohand Melbouci, Wilmington, DE (US)

(73) Assignees: Halliburton Energy Services, Inc., Duncan, OK (US); Hercules Incorporated, Wilmington, DE (US)

( * ) Notice: Subject to any disclaimer, the term of this patent is extended or adjusted under 35 U.S.C. 154(b) by 0 days.

(21) Appl. No.: 09/732,861

(22) Filed: Dec. 8, 2000

(51) Int. Cl.[7] ............................................. E21B 33/13
(52) U.S. Cl. ....................................... 166/293; 166/294
(58) Field of Search .................................. 166/293, 294

(56) References Cited

U.S. PATENT DOCUMENTS

| | | | |
|---|---|---|---|
| 4,433,731 A | 2/1984 | Chatterji et al. ............. | 166/293 |
| 4,462,837 A * | 7/1984 | Baker et al. ................. | 166/293 |
| 4,466,837 A | 8/1984 | Chatterji et al. .............. | 106/85 |
| 4,515,635 A | 5/1985 | Rao et al. ...................... | 106/90 |
| 4,555,269 A | 11/1985 | Rao et al. ...................... | 106/90 |
| 4,557,763 A | 12/1985 | George et al. ................. | 106/90 |
| 4,640,942 A | 2/1987 | Brothers ....................... | 523/130 |
| 4,676,317 A | 6/1987 | Fry et al. ..................... | 166/293 |
| 4,687,516 A | 8/1987 | Burkhalter et al. ........... | 106/90 |
| 4,703,801 A | 11/1987 | Fry et al. ..................... | 166/293 |
| 4,742,094 A | 5/1988 | Brothers et al. ............. | 523/130 |
| 4,791,989 A | 12/1988 | Brothers et al. ............. | 166/293 |
| 5,151,131 A | 9/1992 | Burkhalter et al. ......... | 106/822 |
| 5,263,540 A * | 11/1993 | Dovan et al. ................ | 166/278 |
| 5,346,012 A * | 9/1994 | Heathman et al. .......... | 166/293 |
| 5,392,855 A * | 2/1995 | Bernardi, Jr. et al. ....... | 166/278 |
| 5,669,456 A * | 9/1997 | Audibert et al. ............. | 175/72 |
| 6,019,835 A | 2/2000 | Chatterji et al. ............. | 106/725 |
| 6,182,758 B1 | 2/2001 | Vijn ........................... | 166/293 |

* cited by examiner

*Primary Examiner*—Paul Marcantoni
(74) *Attorney, Agent, or Firm*—Craig W. Roddy; C. Clark Doughery, Jr.

(57) ABSTRACT

Environmentally acceptable well cement fluid loss control additives, cement compositions including the additives and methods of using the compositions are provided. The environmentally acceptable fluid loss control additives are comprised of ethoxylated hydroxyethylcellulose having a reduced molecular weight.

9 Claims, No Drawings

ENVIRONMENTALLY ACCEPTABLE WELL CEMENT FLUID LOSS CONTROL ADDITIVES, COMPOSITIONS AND METHODS

BACKGROUND OF THE INVENTION

1. Field of the Invention

The present invention relates to subterranean well cementing operations, and more particularly, to environmentally acceptable well cement fluid loss control additives, well cement compositions containing the additives and methods of using the compositions.

2. Description of the Prior Art

Hydraulic cement compositions are commonly utilized in subterranean well completion and remedial operations. For example, hydraulic cement compositions are used in primary cementing operations whereby strings of pipe such as casings and liners are cemented in well bores. In performing primary cementing, a hydraulic cement composition is pumped into the annular space between the walls of a well bore and the exterior surfaces of a pipe string disposed therein. The cement composition is permitted to set in the annular space thereby forming an annular sheath of hardened substantially impermeable cement therein which supports and positions the pipe string in the well bore and bonds the exterior surfaces of the pipe string to the walls of the well bore. Hydraulic cement compositions are also utilized in remedial cementing operations such as plugging highly permeable zones or fractures in well bores, plugging cracks or holes in pipe strings and the like.

Fluid loss control agents are used in well cement compositions to reduce fluid loss from the cement compositions to the permeable formations or zones into or through which the cement compositions are pumped. In primary cementing, the loss of fluid, i.e., water, from the cement compositions to a permeable subterranean formation or zone can result in premature gelation of the cement composition whereby bridging of the annular space between the permeable formation or zone and the pipe string being cemented prevents the cement composition from being placed over the entire length of the annulus.

Heretofore, environmentally acceptable hydroxyethylcellulose having an average molecular weight of about 90,000 and higher has been utilized as a well cement composition fluid loss control agent. However, the use of such hydroxyethylcellulose as a cement composition fluid loss additive has involved a number of disadvantages. For example, the ability of the hydroxyethylcellulose to prevent fluid loss in a cement composition decreases rapidly at temperatures above about 230° F. In addition, the hydroxyethylcellulose has a limited salt tolerance. That is, if the salt content of the water in the cement composition is above about 5% by weight of the water, the ability of the hydroxyethylcellulose to prevent fluid loss is reduced. In offshore cementing operations, the hydroxyethylcellulose has been utilized in an aqueous solution so that it can be readily added to the mix water or the cement slurry. In order to prevent the aqueous solution of the hydroxyethylcellulose from having too high a viscosity, the hydroxyethylcellulose must be dissolved in relatively large quantities of water making its mixing and handling more difficult than other fluid loss control agents.

Thus, there is a need for an improved environmentally acceptable hydroxyethylcellulose fluid loss control agent which can be utilized at temperatures higher than 230° F., which can be dissolved in relatively small quantities of water without greatly increasing the viscosity of the solution and which has a higher salt tolerance while maintaining the same fluid loss control.

SUMMARY OF THE INVENTION

The present invention provides environmentally acceptable well cement fluid loss control additives, well cement compositions and methods of using the compositions which meet the needs described above and overcome the deficiencies of the prior art.

The environmentally acceptable well cement fluid loss control additives of this invention are basically comprised of hydroxyethylcellulose having a reduced average molecular weight of about 60,000 ethoxylated in an amount in the range of from about 1 to about 4 moles of ethylene oxide per anhydroglucose unit, i.e., an average molecular substitution of ethylene oxide of 2.5 per anhydroglucose unit. The fluid loss additives can also include a temperature stability increasing agent to increase the temperature at which the additives remain stable and continue to prevent fluid loss. The temperature stability increasing agent can be selected from synthetic hectorite, magnesium oxide and sodium thiosulfate. Of these, magnesium oxide is preferred.

The improved well cement compositions of this invention are basically comprised of a hydraulic cement, water present in an amount sufficient to form a pumpable slurry and the environmentally acceptable well cement fluid loss control additive of this invention, i.e., hydroxyethylcellulose having a reduced average molecular weight of about 60,000 ethoxylated in an amount in the range of from about 1 to about 4 moles of ethylene oxide per anhydroglucose unit. The fluid loss control additive can also include a temperature stability increasing agent selected from the group of synthetic hectorite, magnesium oxide and sodium thiosulfate. Synthetic hectorite and sodium thiosulfate can be added in particulate solid form directly to the hydraulic cement or mix water utilized, or it can be dissolved in water whereby a storable aqueous solution results which can be readily combined with the mix water or cement slurry. Magnesium oxide can only be added to the mix water of the cement slurry.

The methods of this invention for cementing a zone in a subterranean formation penetrated by a well bore are basically comprised of the steps of preparing a cement composition of this invention including the above described environmentally acceptable well cement fluid loss control additive, placing the cement composition in the zone to be cemented and allowing the cement composition to set into an impermeable solid mass therein.

It is, therefore, a general object of the present invention to provide improved environmentally acceptable well cement fluid loss control additives, improved well cement compositions including the additives and methods of using the cement compositions.

Other and further objects, features and advantages of the present invention will be readily apparent to those skilled in the art upon a reading of the description of preferred embodiments which follows.

DESCRIPTION OF PREFERRED EMBODIMENTS

As mentioned, the environmentally acceptable well cement fluid loss control additive of this invention is basically comprised of hydroxyethylcellulose having a reduced molecular weight in the range of from about 30,000 to about 90,000, i.e., an average molecular weight of about 60,000, ethoxylated in an amount in the range of from about 1 to about 4 moles of ethylene oxide per anhydroglucose unit, i.e. an average molecular substitution in the range of from about 2.2 to about 2.7 per anhydroglucose unit, most preferably 2.5 per anhydroglucose unit. The average molecular weight of commercially available hydroxyethylcellulose is about 90,000 or higher. While such hydroxyethylcellulose can be and has been utilized in well cement compositions as an environmentally acceptable well cement fluid loss control additive, it suffers from the disadvantages that it is unstable and its fluid loss control properties are significantly reduced at temperatures above about 230° F. and/or when it is in contact with salt water containing salt in an amount above about 5% by weight of the water. In addition, when the commercially available hydroxyethylcellulose is dissolved in water so that it can be added to a cement slurry or its mix water as a liquid, the resulting solution has a high viscosity. As a result, a liquid hydroxyethylcellulose solution containing only about 7.5% by weight commercial hydroxyethylcellulose can be used.

The above is contrasted with the ethoxylated hydroxyethylcellulose of reduced molecular weight of the present invention which is stable and effectively controls fluid loss from cement compositions at temperatures above 230° F. to at least about 260° F., can be utilized in contact with salt water containing salt up to 37.2% by weight without losing effectiveness and can be dissolved in water up to about 12.5% by weight of the resulting solution which remains relatively low in viscosity.

In order to improve the temperature stability of the improved ethoxylated hydroxyethylcellulose fluid loss control additive of this invention, a temperature stability increasing agent can be combined with the ethoxylated hydroxyethylcellulose. Suitable temperature stability increasing agents which can be utilized include, but are not limited to, synthetic hectorite, magnesium oxide and sodium thiosulfate. Of these, magnesium oxide is preferred. When used, the temperature stability increasing agent is combined with the ethoxylated hydroxyethylcellulose in an amount in the range of from about 50% to about 500% by weight of the ethoxylated hydroxyethylcellulose, preferably in an amount of about 100%.

The improved environmentally acceptable ethoxylated hydroxyethylcellulose fluid loss control additive of this invention can be prepared by treating a commercially available hydroxyethylcellulose having an average molecular weight of about 90,000 or higher with hydrogen peroxide using known techniques and amounts. That is, the commercially available hydroxyethylcellulose is slurried in a mixture of acetone and water and hydrogen peroxide is added to the slurry in an amount and under conditions such that the molecular weight of the hydroxyethylcellulose is reduced to in the range of from about 30,000 to about 90,000, i.e., an average molecular weight of about 60,000. The reduced molecular weight hydroxyethylcellulose formed is separated from the reaction mixture purified, dried and ground.

A preferred environmentally acceptable fluid loss control additive of this invention is comprised of hydroxyethylcellulose having a reduced molecular weight in the range of from about 30,000 to about 90,000 ethoxylated in an amount in the range of from about 1 to about 4 moles of ethylene oxide per anhydroglucose unit.

Another preferred environmentally acceptable fluid loss control additive of this invention is comprised of hydroxyethylcellulose having a reduced average molecular weight of about 60,000 ethoxylated in an average amount of about 2.5 moles of ethylene oxide per anhydroglucose unit.

Yet another preferred fluid loss control additive of this invention is comprised of hydroxyethylcellulose having a reduced molecular weight in the range of from about 30,000 to about 90,000 ethoxylated in an amount in the range of from about 1 to about 4 moles of ethylene oxide per anhydroglucose unit and having a temperature stability increasing agent selected from the group consisting of synthetic hectorite, magnesium oxide and sodium thiosulfate combined therewith in an amount in the range of from about 50% to about 500% by weight of the ethoxylated hydroxyethylcellulose.

Still another preferred fluid loss control additive of this invention is comprised of hydroxyethylcellulose having a reduced average molecular weight of about 60,000 ethoxylated in an average amount of about 2.5 moles of ethylene oxide per anhydroglucose unit and having a temperature stability increasing agent comprised of magnesium oxide combined therewith in an amount of about 100% by weight of the ethoxylated hydroxyethylcellulose.

The improved well cement compositions of the present invention are basically comprised of a hydraulic cement, sufficient water to form a pumpable slurry and the environmentally acceptable well cement fluid loss control additive described above.

A variety of hydraulic cements can be utilized in accordance with the present invention including those comprised of calcium, aluminum, silicon, oxygen and/or sulfur which set and harden by reaction with water. Such hydraulic cements include, but are not limited to, Portland cements, pozzolana cements, gypsum cements, high alumina content cements, silica cements and high alkalinity cements. Portland cements are generally preferred for use in accordance with the present invention, and Portland cements of the types defined and described in *API Specification For Materials And Testing For Well Cements*, API Specification 10, Fifth Edition, dated Jul. 1, 1990 of the American Petroleum Institute are particularly preferred. API Portland cements include classes A. B, C, G and H. API classes G and H are preferred with class G being the most preferred.

The water utilized in the compositions of this invention can be fresh water, salt water, i.e., water containing one or more salts dissolved therein, brine, i.e., saturated salt water produced from subterranean formations, or seawater. Generally, the water can be from any source provided it does not contain an excess of compounds that adversely affect other components in the cement compositions. The water is present in a cement composition of this invention in an amount sufficient to form a pumpable slurry. More particularly, the water is present in a cement composition of this invention in an amount in the range of from about 25% to about 100% by weight of hydraulic cement therein, more preferably in an amount of about 44%.

An environmentally acceptable well cement fluid loss control additive of this invention described above is included in a cement composition of this invention in an amount in the range of from about 0.1% to about 2% by weight of cement in the composition. As mentioned, the additive can be comprised of an ethoxylated hydroxyethylcellulose having a reduced molecular weight or it can be comprised of the ethoxylated hydroxyethylcellulose of a reduced molecular weight combined with a temperature stability increasing agent. The additive can be mixed in particulate solid form with the hydraulic cement or mixing water prior to mixing the cement composition or it can be dissolved in water to form a storable liquid additive which can readily be added to the mixing water or to the cement slurry after it is formed.

A preferred cement composition of this invention is comprised of a hydraulic cement, water present in an amount sufficient to form a pumpable slurry and an environmentally acceptable fluid loss control additive comprised of hydroxyethylcellulose having a reduced average molecular weight of about 60,000 ethoxylated with an average amount of about 2.5 moles of ethylene oxide per anhydroglucose unit, the fluid loss control additive being present in the composition in an amount of about 0.75% by weight of cement in the composition.

Another preferred cement composition of this invention is comprised of hydraulic cement, water present in an amount sufficient to form a pumpable slurry and an environmentally acceptable fluid loss control additive comprised of hydroxyethylcellulose having a reduced molecular weight in the range of from about 30,000 to about 90,000 ethoxylated in an amount in the range of from about 1 to about 4 moles of ethylene oxide per anhydroglucose unit, the fluid loss control additive being present in the composition in an amount in the range of from about 0.1% to about 2% by weight of cement in the composition.

Yet another preferred composition of this invention is comprised of a hydraulic cement, water present in an amount sufficient to form a pumpable slurry and an environmentally acceptable fluid loss control additive comprised of hydroxyethylcellulose having a reduced average molecular weight of about 60,000 ethoxylated in an average amount in the range of from about 2.2 to about 2.7 moles of ethylene oxide per anhydroglucose unit combined with a temperature stability increasing agent selected from the group consisting of synthetic hectorite. magnesium oxide and sodium thiosulfate, the temperature stability increasing agent being present in the additive in an amount in the range of from about 50% to about 500% by weight of the ethoxylated hydroxyethylcellulose and the additive being present in the cement composition in an amount in the range of from about 0.1% to about 2% by weight of cement in the composition.

Still another preferred composition of this invention is comprised of hydraulic cement, sufficient water to form a pumpable slurry and an environmentally acceptable fluid loss control additive comprised of hydroxyethylcellulose having a reduced average molecular weight of about 60,000 ethoxylated in an average amount of about 2.5 moles of ethylene oxide per anhydroglucose unit combined with a temperature stability increasing agent comprised of magnesium oxide, the temperature stability increasing agent being present in an amount of about 100% by weight of the ethoxylated hydroxyethylcellulose and the fluid loss control additive being present in the cement composition in an amount of about 0.75% by weight of cement in the composition.

As will be understood by those skilled in the art, the well cement compositions of this invention can include other conventional well cement additives such as set accelerators, set retarding agents, fillers, weighting materials and the like.

The environmentally acceptable fluid loss control additives of this invention are of low cost as compared to synthetic fluid loss control additives, they function to prevent fluid loss at temperatures of 280° F. and higher, they remain stable in the presence of salt water and they can be dissolved in water to form storable liquid additives in sufficient amounts without increasing the viscosities of the resulting additive solutions or increasing the viscosities of the cement compositions in which they are utilized to unacceptable levels.

The methods of the present invention for cementing a subterranean zone penetrated by a well bore are basically comprised of the steps of preparing a cement composition of this invention as described above, placing the cement composition in the zone to be cemented and allowing the cement composition to set into an impermeable solid mass therein.

In order to further illustrate the environmentally acceptable well cement fluid loss control additives, well cement compositions and methods of this invention, the following examples are given.

EXAMPLE 1

A cement composition including a commercially available hydroxyethylcellulose fluid loss control additive having an average molecular weight of about 90,000 and other conventional additives was prepared. Various additional cement compositions which included a fluid loss control additive of the present invention and the same other conventional additives were also prepared. The composition including the conventional fluid loss control additive was tested at a temperature of 230° F. and the compositions containing the fluid loss control additive of the present invention were tested at 250° F. and 260° F. for thickening time, rheology, free water, settling, and stirring fluid loss. The results of these tests are set forth in Table I below.

The thickening time, rheology, free water and settling tests were all conducted in accordance with the procedures set forth in the above mentioned API Specification 10. The stirring fluid loss and BP-settling tests were performed in accordance with standard test procedures set forth in the Halliburton Global Standard Manual dated May 1997. The specific gravity top-bottom test is conducted by taking four 10 cubic centimeter samples from the cement slurry utilized in the free water test. The specific gravities of the samples are then determined and if there is a large difference between the top and bottom specific gravities, instability is indicated.

The results of these tests are given in Table I below.

TABLE 1

Fluid Loss And Other Tests

|  | No. 1 | No. 2 | No. 3 | No. 4 |
|---|---|---|---|---|
| TEST CEMENT COMPOSITION COMPONENTS | | | | |
| Cement, API Class G, parts by weight | 100 | 100 | 100 | 100 |
| Fresh Water, parts by weight | 46 | 46 | 46 | 46 |
| Prior Art Fluid Loss Control Additive[1], parts by weight | 1 | — | — | — |
| Fluid Loss Control Additive[2] of the present invention, parts by weight | — | 1.5 | 1.75 | 1.75 |
| Manganese Tetroxide[3], parts by weight | 20 | 20 | 20 | 20 |
| Silica Fume[4], parts by weight | 5 | 5 | 5 | 5 |
| Copolymer of 2-acrylamido-2-methylpropane sulfonic acid and malic acid[5], parts by weight | 0.6 | 0.7 | 0.8 | 1 |
| Silica Flour[6], parts by weight | 35 | 35 | 35 | 35 |
| DENSITY, lb/gal | 17.5 | 17.5 | 17.5 | 17.5 |
| THICKENING TIME | | | | |
| Temperature | 230° F. | 250° F. | 250° F. | 260° F. |
| 70 Bc, hrs:mins. | 4:45 | 3:02 | 3:22 | 4:21 |
| 100 Bc, hrs:mins. | 4:50 | 3:05 | 3:27 | 4:27 |

TABLE 1-continued

Fluid Loss And Other Tests

|  | No. 1 | No. 2 | No. 3 | No. 4 |
|---|---|---|---|---|
| RHEOLOGY AFTER CONDITIONING |  |  |  |  |
| Temperature | 230° F. | 250° F. | 250° F. | 260° F. |
| 300-200-100 | 160-102-48 | 182-124-65 | 210-165-102 | 200-175-94 |
| 60-30-6-3 | 28-13-4-3 | 40-20-5-3 | 63-43-9-5 | 58-29-7-5 |
| FREE WATER, % by volume | 0 | 0 | 0 | 0 |
| SETTLING, % by volume | 0 | 0 | 0 | 0 |
| SPECIFIC GRAVITY, top/bottom | 2.10/2.15 | 2.10/2.10 | 2.09/2.08 | — |
| STIRRING FLUID LOSS |  |  |  |  |
| Temperature | 230° F. | 250° F. | 250° F. | 260° F. |
| cc/30 min. | 130 | 56 | 19 | 63 |
| BP - Settling |  |  |  |  |
| Deviation, % | 2 | 2 | 2 | 2 |
| Height Reduction, mm | 2 | 2 | 3 | 2 |
| Specific gravity from Top-Bottom | 2.07 | 2.09 | 2.08 | 2.07 |
| 1 | 2.09 | 2.10 | 2.08 | 2.08 |
| 2 | 2.09 | 2.11 | 2.09 | 2.08 |
| 3 | 2.10 | 2.12 | 2.11 | 2.08 |
| 4 | 2.12 | 2.14 | 2.13 | 2.11 |

[1]Hydroxyethylcellulose having an average molecular weight of 90,000.
[2]Hydroxyethylcellulose having an average molecular weight of 60,000 ethoxylated with 2.5 moles of ethylene oxide per anhydroglucose unit.
[3]Weighting agent.
[4]Anti-free water additive.
[5]Set retarding additive.
[6]Anti-strength retrogression additive.

From Table I it can be seen that the fluid loss control additive of the present invention is effective up to a temperature of at leas 260° F.

EXAMPLE 2

Additional test cement slurries were prepared as described in Example 1 except that the ethoxylated hydroxyethylcellulose fluid loss control additive of the present invention included synthetic hectorite and the test were conducted at temperatures of 230° F., 260° F., 275° F. and 300° F. The test cement compositions were tested in the same manner as described in Example 1. The results of these tests are given in Table II below.

TABLE II

Fluid Loss And Other Tests

|  | No. 1 | No. 2 | No. 3 | No. 4 |
|---|---|---|---|---|
| TEST CEMENT COMPOSITION COMPONENTS |  |  |  |  |
| Cement, API Class G, parts by weight | 100 | 100 | 100 | 100 |
| Fresh Water, parts by weight | 46 | 46 | 46 | 46 |
| Prior Art Fluid Loss Control Additive[1], parts by weight | 1.0 | — | — | — |
| Fluid Loss Control Additive[2] of the present invention, parts by weight | — | 1.3 | 1.3 | 1.3 |
| Manganese Tetroxide[3], parts by weight | 20 | 20 | 20 | 20 |
| Silica Fume[4], parts by weight | 5 | 5 | 5 | 5 |
| Copolymer of 2-acrylamido-2-methylpropane sulfonic acid and malic acid[5], parts by weight | 0.6 | 1 | 1.2 | 1.2 |
| Silica Flour[6], parts by weight | 35 | 35 | 35 | 35 |
| DENSITY, lb/gal | 17.5 | 17.5 | 17.5 | 17.5 |
| THICKENING TIME |  |  |  |  |
| Temperature | 230° F. | 260° F. | 275° F. | 300° F. |
| 70 Bc, hrs:mins. | 4:45 | 4:20 | 4:38 | — |
| 100 Bc, hrs:mins. | 4:50 | 4:26 | 4:40 | — |
| RHEOLOGY AFTER CONDITIONING |  |  |  |  |
| Temperature | 230° F. | 260° F. | 275° F. | 300° F. |
| 300-200-100 | 160-102-48 | 275-207-160 | 225-150-75 | 225-150-75 |
| 60-30-6-3 | 28-13-4-3 | 110-60-10-5 | 45-22-4-2 | 45-22-4-2 |
| FREE WATER, % by volume | 0 | 0 | 0 | 0 |
| SETTLING, % by volume | 0 | 0 | 0 | 0 |
| SPECIFIC GRAVITY, top/bottom | 2.10/2.15 | 2.10/2.15 | 2.08/2.12 | 2.06/2.12 |
| STIRRING FLUID LOSS |  |  |  |  |
| Temperature | 230° F. | 260° F. | 275° F. | 300° F. |
| cc/30 min. | 130 | 24 | 40 | 50 |

TABLE II-continued

Fluid Loss And Other Tests

|  | No. 1 | No. 2 | No. 3 | No. 4 |
|---|---|---|---|---|
| BP - Settling | | | | |
| Deviation, % | 2 | 1 | 2 | — |
| Height Reduction, mm | 2 | 2 | 2 | — |
| Specific gravity from Top-Bottom | 2.07 | 2.18 | 2.08 | — |
| 1 | 2.09 | 2.18 | 2.09 | — |
| 2 | 2.09 | 2.18 | 2.10 | — |
| 3 | 2.10 | 1.29 | 2.10 | — |
| 4 | 2.12 | 2.20 | 2.13 | — |

[1]Hydroxyethylcellulose having an average molecular weight of 90,000.
[2]Hydroxyethylcellulose having a molecular weight of 60,000 ethoxylated with 2.5 moles of ethylene oxide per anhydroglucose unit combined with synthetic hectorite whereby the synthetic hectorite was present in an amount of 12% by weight of the mixture.
[3]Weighting agent.
[4]Anti-free water additive.
[5]Set retarding additive.
[6]Anti-strength retrogression additive.

From Table II it can be seen that the fluid loss control additive of this invention including synthetic hectorite had increased temperature stability.

EXAMPLE 3

The procedure set forth in Example 2 was repeated except that the cement composition including the commercially available fluid loss control additive was not tested and the fluid loss control additive of the present invention included magnesium oxide. Also, the tests were conducted at 230° F., 250° F., 260° F. and 280° F. The test cement compositions were tested in the same manner as described in Example 1 except the BP-settling test was not conducted. The results of these tests are given in Table III below.

TABLE III

Fluid Loss And Other Tests

|  | No. 1 | No. 2 | No. 3 | No. 4 |
|---|---|---|---|---|
| TEST CEMENT COMPOSITION COMPONENTS | | | | |
| Cement, API Class G, parts by weight | 100 | 100 | 100 | 100 |
| Fresh Water, parts by weight | 50 | 50 | 50 | 50 |
| Fluid Loss Control Additive[1] of the present invention, parts by weight | 1.25 | 1.25 | 1.25 | 1.75 |
| Manganese Tetroxide[2], parts by weight | 20 | 20 | 20 | 20 |
| Silica Fume[3], parts by weight | 5 | 5 | 5 | 5 |
| Copolymer of 2-acrylamido-2-methylpropane sulfonic acid and malic acid[4], parts by weight | 0.8 | 0.8 | 0.8 | 1.0 |
| Silica Flour[5], parts by weight | 35 | 35 | 35 | 35 |
| DENSITY, lb/gal | 17 | 17 | 17 | 17 |
| RHEOLOGY AT MIX | | | | |
| 300-200-100 | 289-205-110 | 300+-210-115 | — | 300+-265-225 |
| 60-30-6-3 | 68-36-8-4 | 71-37-8-4 | — | 152-83-20-11 |
| RHEOLOGY AFTER CONDITIONING | | | | |
| Temperature | 195° F. | 195° F. | — | 195° F. |
| 300-200-100 | 95-60-23 | 105-71-35 | — | 230-151-77 |
| 60-30-6-3 | 16-7-2-1 | 21-10-2-1 | — | 46-22-4-2 |
| FREE WATER, % by volume | 0 | 0 | — | 0 |
| SETTLING, % by volume | 0 | — | — | 0 |
| SPECIFIC GRAVITY, top/bottom | 1.982/2.093 | — | — | 2.027/2.082 |
| STIRRING FLUID LOSS | | | | |
| Temperature | 250° F. | 250° F. | 260° F. | 280° F. |
| cc/30 min. | 1st Test  2nd Test | 1st Test  2nd Test | | |
|  | 100   116 | 32   60 | 77 | 84 |

[1]Hydroxyethylcellulose having a molecular weight of 60,000 ethoxylated with 2.5 moles of ethylene oxide per anhydroglucose unit combined with magnesium oxide whereby the magnesium oxide was present in an amount of 50–100% by weight of the mixture.
[2]Weighting agent.
[3]Anti-free water additive.
[4]Set retarding additive.
[5]Anti-strength retrogression additive.

From Table III it can be seen that the magnesium oxide in the fluid loss control additive increased the temperature at which the fluid loss control additive remains stable.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of cementing a subterranean zone penetrated by a well bore comprising the steps of:

(a) preparing a cement composition comprising a hydraulic cement, sufficient water to form a pumpable slurry and an environmentally acceptable fluid loss control additive comprised of hydroxyethylcellulose having a reduced molecular weight in the range of from about 30,000 to about 90,000 ethoxylated in an amount in the range of from about 1 to about 4 moles of ethylene oxide per anhydroglucose unit;

(b) placing said cement composition in said zone to be cemented; and (c) allowing said cement composition to set into an impermeable solid mass therein.

2. The method of claim 1 wherein said hydraulic cement is Portland cement.

3. The method of claim 1 wherein said water is fresh water or salt water.

4. The method of claim 3 wherein said water is present in an amount in the range of from about 25% to about 100% by weigh of cement in said composition.

5. The method of claim 1 wherein said hydroxyethylcellulose in said additive has an average molecular weight of about 60,000.

6. The method of claim 5 wherein said hydroxyethylcellulose in said additive is ethoxylated in an average amount of about 2.5 moles of ethylene oxide per anhydroglucose unit.

7. The method of claim 1 wherein said additive further comprises a temperature stability increasing agent.

8. The method of claim 7 wherein said temperature stability increasing agent in said additive is selected from the group consisting of synthetic hectorite, magnesium oxide and sodium thiosulfate.

9. The method of claim 1 wherein said temperature stability increasing agent in said additive is present in an amount in the range of from about 50% to about 500% by weight of said ethoxylated hydroxyethylcellulose.

* * * * *